P. A. BOWEN.
SEWING MACHINE.
APPLICATION FILED JUNE 15, 1917.

1,306,994.

Patented June 17, 1919.
5 SHEETS—SHEET 2.

Inventor.
Philip A. Bowen
by Heard Smith & Tennant.
Attys

P. A. BOWEN.
SEWING MACHINE.
APPLICATION FILED JUNE 15, 1917.

1,306,994.

Patented June 17, 1919.
5 SHEETS—SHEET 3.

Inventor.
Philip A. Bowen
by Heard Smith & Tennant
Attys.

UNITED STATES PATENT OFFICE.

PHILIP A. BOWEN, OF LYNN, MASSACHUSETTS, ASSIGNOR TO LILLIAN A. LITTLE, OF LYNN, MASSACHUSETTS.

SEWING-MACHINE.

1,306,994.  Specification of Letters Patent.  Patented June 17, 1919.

Application filed June 15, 1917. Serial No. 174,912.

*To all whom it may concern:*

Be it known that I, PHILIP A. BOWEN, a citizen of the United States, residing at Lynn, county of Essex, State of Massachusetts, have invented an Improvement in Sewing - Machines, of which the following description, in connection with the accompanying drawing, is a specification, like characters on the drawing representing like parts.

In my Patent No. 1,250,272, dated December 18, 1917, I have illustrated and described a lock-stitch sewing machine of that type having a horn on which the work is supported and a stitch-forming mechanism comprising a needle situated above the work and adapted to penetrate the work, a looper carried by the horn to loop an under thread around the needle so that upon its backward movement it will draw a loop through the work, a shuttle situated above the work and carrying an upper thread, and means to cast said loop around the shuttle, thus interlocking the under and upper threads.

The objects of the present invention are to provide certain improvements in the sewing machine illustrated in my said patent which enable the machine to be operated more effectively and at an increased speed.

I will first describe a machine embodying my invention and will then point out the novel features thereof in the appended claims.

In the drawings wherein a selected embodiment of the invention is shown.

Figs. 13, 14, 15 and 16 are plan views of the looper showing the operation in casting the loop of needle thread about the shuttle;

Fig. 18 is a plan view of the mechanism for rotating the looper;

Fig. 20 is a plan view.

The operative parts of the sewing machine are mounted on a frame 1 which may have any suitable construction adapted for this purpose. This frame supports a driving shaft 2 operated from a suitable driving pulley 3 and from which the operative parts of the machine are actuated. The work *w* is supported on a horn 4 and is held in place during the stitching operation by a presser foot 5. The horn 4 has a construction similar to that illustrated in my said Patent No. 1,250,272, that is, it is provided at its upper end with an eye or opening 6 into which the needle 7 is adapted to enter when it is given its penetrating thrust, and said horn also carries at its upper end a rotatable looper member 8 having an axial needle-receiving opening 9 and also provided with an aperture 10 through which the under thread 11 extends.

The horn 4 is mounted for rotation about a vertical axis, as usual, and for this purpose it is provided with a hub member 12 which is rotatably mounted on a post 13 that is carried by a bracket 15 secured to the frame 1. Means are provided for raising and lowering the horn on the post, and this is herein accomplished by the provision of a collar 16 which is splined to the post and on which the hub 12 rests, a ball-bearing 17 preferably being provided between the hub and the collar, and a second collar 18 which is situated beneath the collar 16 and is rotatably mounted on the post. The collars 16 and 18 have coöperating inclined faces 20 and 21 so arranged that when the collar 18 is turned, the collar 16 and consequently the horn 4 will be raised or lowered. The collar 18 is provided with a handle 22 by which it may be given its turning movement, and for holding it in any desired position, it is provided with an extension 23 carrying a pin 24 which is adapted to snap into any one of a plurality of shallow recesses 250 formed in the bracket 15. The looper member 8 is given its rotative movement by means similar to that described in my above-mentioned patent. It is provided with beveled gear teeth which mesh with beveled gear teeth 25 on a flexible shaft 26 which is geared to a gear 27 formed on a shaft 28 that extends axially through the post 13. The shaft 28 is geared to a cross-shaft 29 which in turn is geared to a vertically-extending shaft 30 that is driven from the shaft 2 by means of beveled gears 31.

Figure 8:
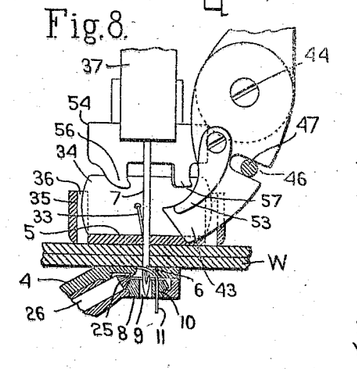
Figs. 8, 9, 10 and 11 are views showing the operation of the needle, loop-retainer and looper in casting a loop of under thread about the shuttle.
Figure 9:
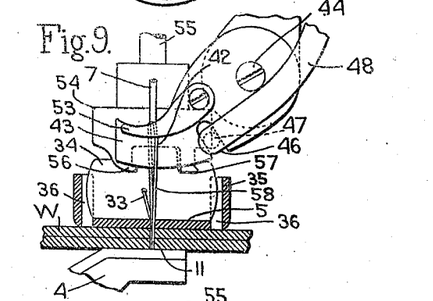
Figure 10:
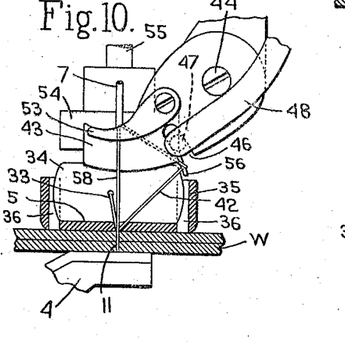
Figure 11:
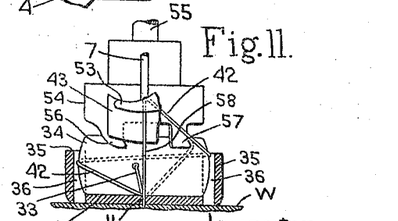

The under thread 11 is taken from a suitable source of supply through a guiding trumpet 32 and thence through the horn 4 to the aperture 10 in the looper member 8, all as illustrated in said above-mentioned patent. The upper thread is indicated at 33 and this is taken from a bobbin carried by a shuttle 34. The shuttle 34 in turn is carried by the presser foot 5, said presser foot being formed with a pocket or shuttle retainer 35 in which the shuttle 34 is received. The walls of the shuttle retainer are formed with vertical ribs 36 which loosely fit into grooves formed in the sides of the shuttle so that the shuttle is held from rotation. The needle 7 is carried by a vertically-reciprocating needle-bar 37 which is mounted for vertical reciprocation in the head 38. Said needle bar is connected at its upper end to a lever 39 pivoted at 40 to the frame and actuated by a suitable cam carried by the shaft 2, as described in said patent. In the operation of forming a stitch, the needle 7 is first given its downward penetrating thrust to cause it to penetrate the work, as shown in Fig. 8, and during this downward movement, it passes through an opening 41 formed in the presser foot 5. While the needle is in its lowered position the rotation of the looper member 8 carries a loop of the under thread 11 around the needle so that when the needle is raised again it draws a loop 42 of under thread up through the work. This loop is then engaged by a loop-retainer and is acted upon by a looper to cast it about the shuttle, thus causing interlocking of the upper and under threads, all as described in my above-mentioned patent. In the present invention, however, I have provided an improved loop-retainer and looper which operate with more precision than the corresponding devices illustrated in my before-mentioned patent and which are also capable of high speed operation. The loop-retainer is shown at 43 and it is in the form of a blade which is pivoted at 44 to an arm 45 secured to the head 38. This blade has a slot 46 formed in its under side in which is received a pin or finger 47 extending laterally from an arm 48 that is secured to and carried by a rocker 49 pivoted at 50 to the head 38. This rocker is provided with a cam slot 51 in which is received a pin or projection 52 extending from the needle-bar 37. With this construction the vertical movement of the needle bar 37 will operate to oscillate the loop-retainer about its pivot 44, as shown in Figs. 8 to 11. The loop-retainer herein shown not only enters and retains the loop 42 which is drawn through the work by the upward movement of the needle 7, but it also operates to insure positively the shedding of said loop from the needle 7 so as to avoid any possibility of said loop catching on the needle as it is being carried about the shuttle 34. For this purpose the loop-retainer is provided with a resilient finger 53 having a laterally-bent end to form with the loop-retainer a flaring mouth. When the loop-retainer is moved from the position shown in Fig. 8 to that shown in Fig. 9 thereby to enter the loop 42, the outer leg of the loop will pass between the loop-retainer and the finger 53 and will be frictionally gripped by the loop-retainer and said finger. After the loop has been cast about the shuttle by the looper, as shown in Figs. 10 and 11, the loop-retainer swings downwardly and because the outer leg of the loop is clamped between said loop-retainer and the finger 53, the loop will be positively cleared from the needle. As the loop-retainer swings into the position shown in Fig. 8, the loop will be shed therefrom when the take-up presently to be described comes into action.

Figure 19:
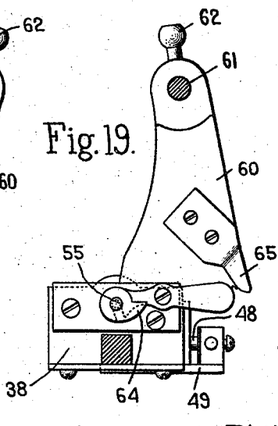
Fig. 19 is a section on the line 19—19, Fig. 12.
Figures 21, 22:
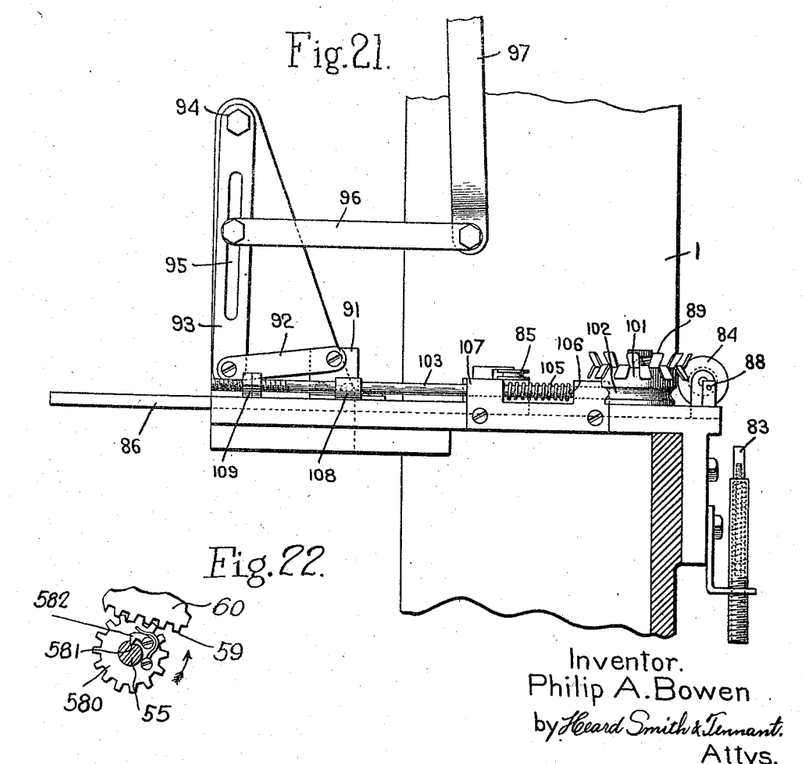
Fig. 21 is a side view of the take-up mechanism.
Fig. 22 is a view showing the construction for giving intermittent rotary movement to the looper shaft.

The looper by which the loop 42 is cast about the shuttle is indicated at 54 and it is somewhat similar to the looper illustrated in my above-mentioned patent. It is carried by a shaft 55 which is journaled in the head 38 and which is rotated by means presently to be described. The looper is situated directly above the shuttle and is provided with a finger 56 which is adapted to engage the loop 42 as the looper rotates and carry said loop about the shuttle 34. The looper has an intermittent rotary movement, said looper being at rest while the loop 42 is being drawn through the work and then having a quick rotary movement through one complete revolution, during which rotary motion the finger 56 engages the loop 42, as shown in Fig. 10, and carries it about the shuttle, the loop being drawn between the shuttle and the shuttle-retainer and thus becoming interlocked with the shuttle thread 33. While the loop 42 is being cast about the shuttle, as shown in Fig. 10, it is still retained on the loop-retainer 43, and consequently the leg 58 of the loop is held in the position shown in Figs. 10 and 11. It is desirable that this portion of the loop should be cleared from the needle 7 before it makes its next descent so as to avoid any possibility that the needle will become entangled in the loop. To provide for this I have formed a guard finger 57 on the looper 54 which is so situated that just as the looper completes its rotative movement, the finger 57 will engage the leg 58 of the loop and bend it into the dotted line position, Fig. 11, thus taking it entirely away from the needle 7 and avoiding any possibility that the needle will become caught therein. After the parts are in this position the loop-retainer 43 is swung downwardly into the position shown in Fig. 8, thereby shedding the loop. The mechanism for giving rotation to the looper is shown in Figs. 18 and 19. The looper shaft 55 has a pinion 580 mounted thereon and connected thereto by means of a pawl-and-ratchet connection which is shown in Fig. 22. The shaft 55 is formed with the shoulder 581 which is adapted to be engaged by a spring-pressed pawl 582 that is carried by the pinion 580. When the pinion rotates in the direction of the arrow in Fig. 22, it will rotate the shaft with it because of the engagement of the pawl 582 with the shoulder 581, but the shaft will not be rotated when the pinion is rotated in the opposite direction. This pinion 580 meshes with a rack 59 carried by a member 60 that is pivotally mounted at 61 on the frame, said member having a stud provided with a ball end 62 which operates in a cam groove formed in the periphery of the cam member 63 fast on the shaft 2. The member 60 is thus given an oscillatory movement and its movement in one direction will cause a complete rotation of the shaft 55 and the looper thereon because of the pawl-and-ratchet connection between the pinion 580 and the shaft 55, while during the movement of the member 60 in the opposite direction, the shaft 55 will remain stationary.

I have provided herein a novel means for preventing the shaft 55 from over-running and for bringing the looper invariably to rest in its proper position at the end of each rotation of the looper. For this purpose the shaft 55 has a finger 64 fast thereon and the member 60 carries a coöperating finger 65.

Fig. 19 shows the parts in the position they occupy when the looper begins its rotative movement. Fig. 18 shows the position of the parts when the looper has completed its rotation. The movement of the arm 60 from the position shown in Fig. 19 to that shown in Fig. 18 will rotate the pinion 580 and shaft 55 through one complete revolution and at the end of the revolution the finger 65 has been brought into position to be engaged by the finger 64, as seen in Fig. 18, and thus any over-running of the shaft 55 and the looper is prevented. When the member 60 returns from the position shown in Fig. 18 to that shown in Fig. 19, the shaft 55 remains stationary. By this means the looper will always be maintained in proper timed relation with the other parts of the stitch-forming mechanism even when the machine is running at a high rate of speed.

The work is fed during the stitching operation by a feeding finger 66 carried by an arm 67 that is pivoted on a stud 68 carried by the frame. This arm is oscillated by means of an actuator 69 also pivotally mounted on the stud 68 and provided with a roll 70 engaging in the same cam groove of the cam 63 as does the projection 62. The actuator 69 is forked at its end and the arms of the fork straddle a projection 71 extending from the arm 67. One arm of the fork carries an adjusting screw 72 and the other arm carries a U-shaped adjusting member 73, the position of which can be adjusted by the nut 74 thereon. The oscillatory movement of the actuator 69 will cause the adjusting members 72 and 73 to engage the projections 71 and thus oscillate the arm 67, thereby giving the work an intermittent movement. The construction is such that the feeding movement of the arm 67 will take place when the needle is withdrawn from the work and the backward movement when the needle is in the work.

Figure 4:
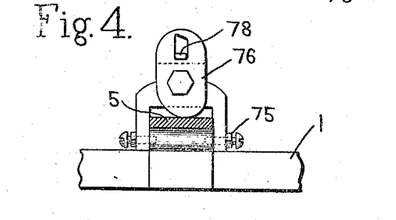
Fig. 4 is a section on the line 4—4, Fig. 3.
Figure 5:
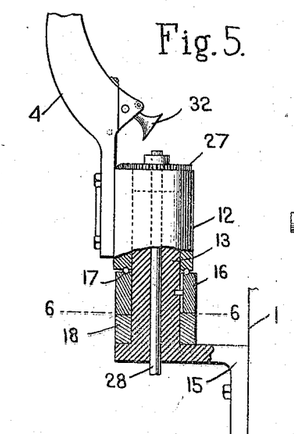
Fig. 5 is a fragmentary sectional view of the horn and its support.
Figure 6:
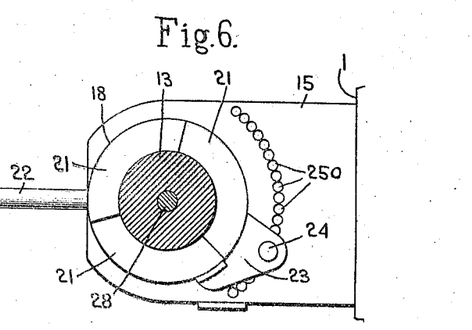
Fig. 6 is a section on the line 6—6, Fig. 5.
Figure 7:
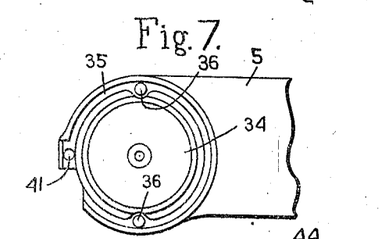
Fig. 7 is a top plan view of the presser foot showing the shuttle supported thereby.

The presser foot 5 is pivotally mounted to the frame at 75, and, as in my above-mentioned patent, a suitable lock is provided for locking the presser foot against the work during the penetrating thrust of the needle 7 and for unlocking the presser foot while the work is being fed and when the needle is withdrawn. In my present invention, however, the lock is a yielding one so that it will operate equally well even though the work varies in thickness. The presser foot lock is shown as an oscillating cam member 76 which is pivoted to an arm 77 carried by the frame. This cam member is acted upon by a lever 78 which is pivoted at 79 upon an extension 80 of the actuator 69, said lever 78 being acted upon by a spring 81 which tends to hold it against the stop 82. There is a certain amount of lost motion between the adjusting members 72 and 73 and the projections 71 so that when the actuator 69 starts its movement in a direction to give the feeding arm 67 its work-feeding movement the initial movement of the actuator 69 will operate to release the lock 76, thus unclamping the presser foot and relieving its pressure on the work. During the initial part of the reverse movement of the actuator 69, the locking member 76 is moved into locking position shown in Fig. 4, thus clamping the presser foot against the work and it remains in this position during the complete return movement of the actuator 69. Since the member 78 which actuates the lock 76 is yieldingly connected to the actuator 69 through the spring 81, the lock will readily accommodate itself to any thickness of work. The under thread 11 is acted upon by a suitable take-up mechanism which operates to set the stitch at the proper time in the cycle of operations. This under thread extends from the trumpet 32 through a tension member 83, thence over a guide roll 84, thence around a roll 85 on a take-up member 86 that is mounted for reciprocation in suitable guideways 87; from this roll 85 the thread passes around a guide pin 88 and thence once or more around a rotatable tension member 89, and thence through a suitable guide eye 90 to the source of supply. The take-up slide 86 has a bracket 91 secured thereto which is pivotally connected by a link 92 to a lever 93 pivoted at 94. The lever 93 is slotted, as at 95, and is connected by a link 96 to an actuating lever 97 pivoted at 98 to the frame and provided with a roll 99 that operates in a cam groove 100 formed on the frame of the cam member 63. With this construction it will be seen that movement of the take-up member 86 to the right, Fig. 20, or to the left, Fig. 21, will operate to take up slack in the under thread and thus set the stitch. The cam groove 100 is so designed as to give the take-up member 86 its stitch-setting movement at the proper time in the cycle of operations and to give said member 86 a movement in the opposite direction at the time that the loop 42 is being pulled through the work.

Figure 20:
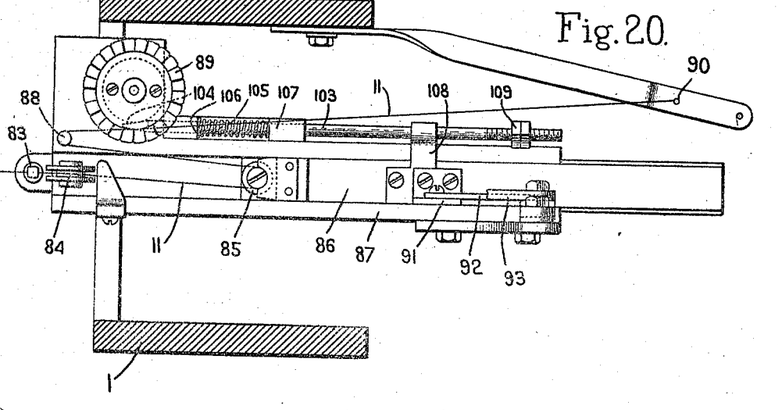

In order to effectively set the stitch, I have provided means for locking the tension disk 89 from rotation just at the time that the stitch is being set and then immediately thereafter releasing said disk to permit thread to be drawn from the source of supply. The tension member 89 is shown as provided with a hub 101 having a groove 102 therein. 103 is a slidable locking member having a conical end 104 adapted to frictionally engage the groove 102. This locking member 103 is acted upon by a spring 105 which tends to urge it into its locking position. This spring is shown as surrounding the locking member 103 and as confined between a pin 106 carried by the locking member and a bearing 107 through which the locking member slides. The take-up member 86 has an arm 108 rigid therewith and provided with an aperture through which the locking member 103 extends. Said locking member carries an adjustable collar 109 adapted to be engaged by the arm 108 during the backward movement of the take-up member. The parts are shown in Figs. 20 and 21 in the position they occupy just after the loop 42 has been cast about the shuttle. At this time the take-up member 86 moves to the right, Fig. 20, thereby taking up the slack in the under thread 11 and setting the stitch. The tension disk 89 is locked from movement so that the thread cannot be drawn from the source of supply, and consequently the full movement of the take-up member 86 will be operative in setting the stitch. Just as the stitch is set tight, the arm 108 engages the collar 89 and thus moves the locking member 103 backwardly and thereby unlocks the tension device 89 so that during further movement of the member 86 a certain amount of thread will be drawn from the thread supply. The cam 100 is so constructed that the take-up member 86 will be held in its retracted position, thus holding the lock 103 released while the needle is making its penetrating thrust. This take-up mechanism is not claimed herein, but is made the subject of a divisional application filed March 14, 1919, Se. No. 282,637.

Figure 1:
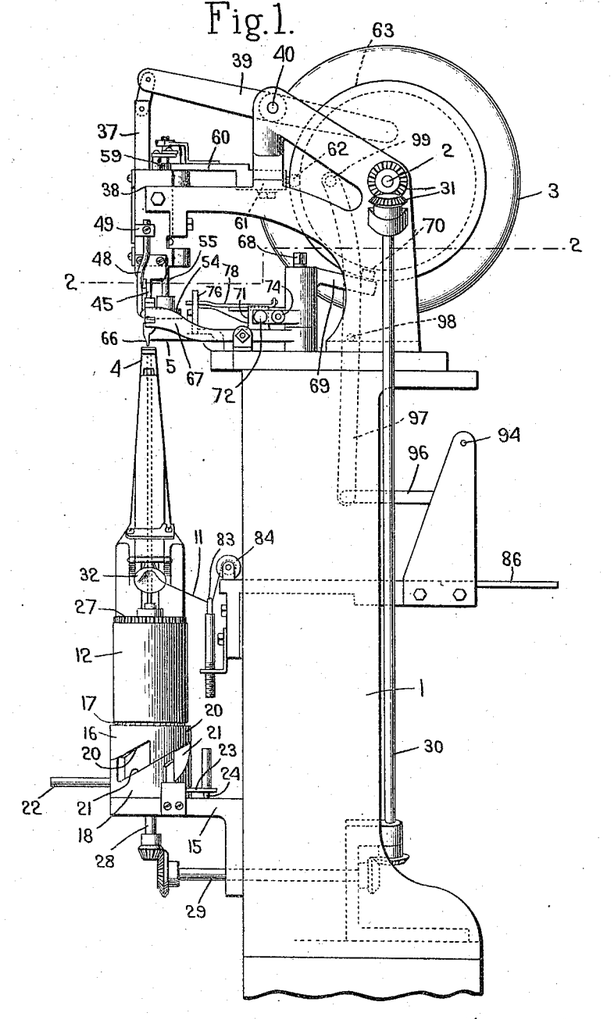
Figure 1 is a side view of a machine embodying my invention.
Figure 2:
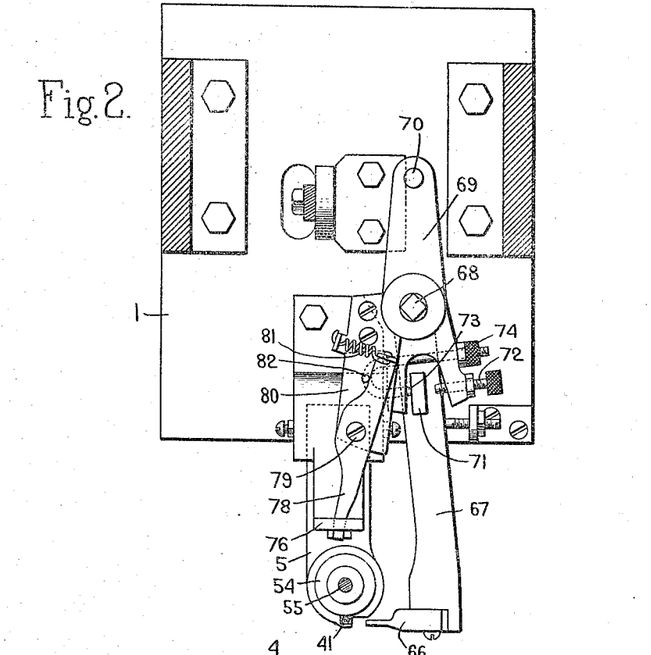
Fig. 2 is an enlarged sectional view on the line 2—2, Fig. 1.
Figure 3:
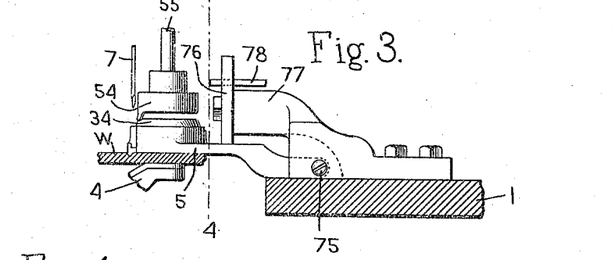
Fig. 3 is a fragmentary side view of the presser foot with the shuttle thereon and the looper.
Figures 12, 17:
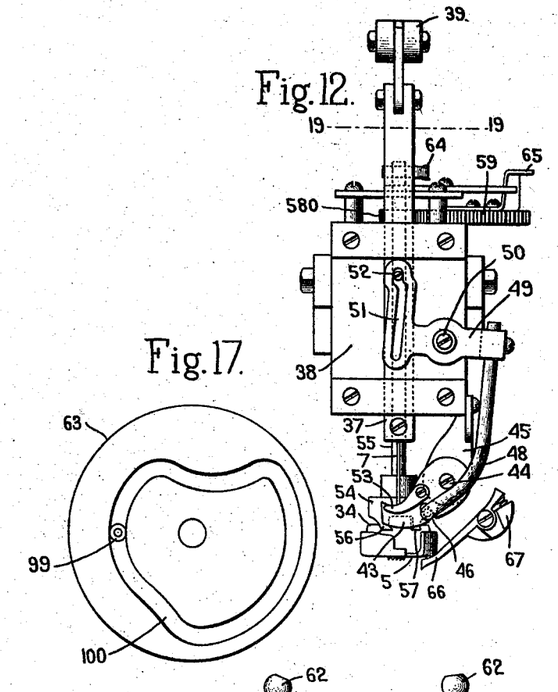
Fig. 12 is a front view of the head on which the needle, looper and loop-retainer are sustained.
Fig. 17 is a side view of the cam for operating the take-up device.
Figure 13:
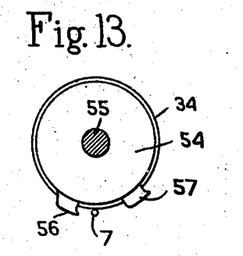
Figure 14:
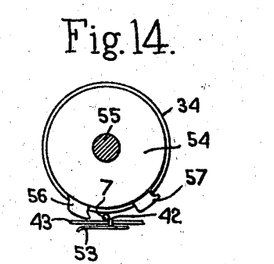
Figure 15:
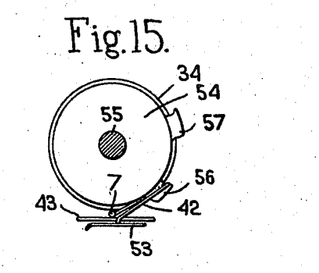

While the operation of the machine will be understood from the above, yet I will briefly summarize it as follows:

When the machine has been brought to rest, the needle 7 is raised and the parts are in the position shown in Figs. 3 and 12. When the machine is started the needle is given its penetrating thrust through the work and brought into the position shown in Fig. 8, and at the same time the loop-retainer is swung downwardly into the position also seen in Fig. 8. When the needle has thus been carried through the work the rotation of the looper element 8 carries the under thread 11 around the needle and into the hook thereof so that when the needle rises, as shown in Fig. 9, a loop 42 of the under thread will be drawn through the work and into a position above the shuttle. During this upward movement of the needle the loop-retainer 43 is swung forwardly and upwardly and enters the loop 42, as seen in Fig. 9, the outer leg 58 of the loop passing between the loop-retainer and the finger 53. The member 60 is then actuated from the position shown in Fig. 19 to that shown in Fig. 18, thereby rotating the looper 54 and causing the latter to cast the loop 42 about the shuttle, as shown in Figs. 10 and 11. As the looper completes its rotative movement the finger 57 thereof engages the leg 58 of the loop and carries it out of the way of the needle. As the needle begins to make its next descent the pin 52 engages the offset portion of the cam groove 51 and thus gives the loop-retainer a quick movement into the position shown in Fig. 8, and during this movement the loop 42 is carried positively to one side of the path of the needle by reason of the fact that the loop is frictionally retained by the resilient finger 53. The loop which is thus cast about the shuttle is manipulated so as to avoid any possibility that the needle will become entangled therein in making its next descent. After the loop has thus been cast about the shuttle the take-up bar 86 is moved rearwardly to take up the under thread and set the stitch, and during this time the locking member 103 is in locking engagement with the tension 89. When the stitch has been fully set the lock is released by engagement of the arm 108 with the collar 109, as above explained. While the stitch is thus being set, the actuator 69 is operated and the initial turning movement thereof acts to release the lock 76 for the presser foot, after which the set-screw 72 is brought into engagement with the projection 71 so that motion will be communicated to the work-feeding arm 67. The clamping pressure of the presser foot is thus relieved before the feeding movement takes place. Immediately that the feeding movement is completed the actuator 69 returns to the position shown in Fig. 2, and during this return movement the presser foot is locked again and the work-feeding arm 67 is returned to its normal position.

I claim:

1. A lock stitch sewing machine having in combination a horn provided with a thread-delivery eye, a shuttle situated above the horn, a reciprocating needle to draw a loop of thread from the horn through the work, a movable loop-retainer adapted to enter the loop and take it from the needle, and a looper to cast said loop about the shuttle while it is held on the loop-retainer, said loop-retainer having means for positively removing from the path of the needle the portion of the loop engaged thereby.

2. A lock stitch sewing machine having in combination a horn provided with a thread-delivery eye, a shuttle situated above the horn, a reciprocating needle to draw a loop of thread through the work, an oscillatory loop-retainer movable toward and from the needle and adapted to enter the loop of thread, a looper to cast said loop about the shuttle, and thread-gripping means on the loop-retainer.

3. A lock stitch sewing machine having in combination a horn provided with a thread-delivery eye, a shuttle situated above the horn, a reciprocating needle to draw a loop of thread through the work, an oscillatory loop-retainer movable toward and from the needle and adapted to enter the loop of thread, a looper to engage one leg of the loop and cast it about the shuttle, and means on the loop-retainer to grip the other leg of the loop whereby on backward movement of said loop-retainer the loop is carried clear from the needle.

4. A lock stitch sewing machine having in combination a horn provided with a thread-delivery eye, a shuttle above the horn, a reciprocating needle to draw a loop of thread through the work, a movable loop-retainer to enter said loop, a looper to cast said loop about the shuttle, and resilient thread-gripping means carried by the loop-retainer.

5. A lock stitch sewing machine having in combination a horn, a presser-foot, a shuttle carried by the presser-foot, a needle to draw a loop of thread from the horn through the work, a looper to cast said loop about the shuttle and means to hold the shuttle from turning movement relative to the presser-foot.

6. A lock stitch sewing machine, such as set forth in claim 5, in which the shuttle is provided with grooves and the presser-foot is provided with ribs to engage said grooves, thereby to prevent the shuttle from turning movement.

7. A lock stitch sewing machine having in combination a horn, a shuttle, a needle to draw a loop of thread from the horn through the work, a rotary looper adapted in its revolution to engage first one leg of the loop and carry it about the shuttle and then to engage the other leg of the loop and to remove it from the path of the needle.

8. A lock stitch sewing machine having in combination a horn, a shuttle, a needle to draw a loop of thread from the horn through the work, and a rotary looper having two thread-engaging fingers.

9. A lock stitch sewing machine having in combination a horn, a shuttle, a needle to draw a loop of thread from the horn through the work, and a rotary looper having two thread-engaging fingers, one of which engages one leg of the loop and carries it about the shuttle and the other of which engages the other leg of the loop and removes it from the path of the needle.

10. A lock stitch sewing machine having in combination a work-supporting horn, a presser foot capable of movement toward and from the horn, a yieldingly-actuated cam to clamp the presser foot against the work, a needle, a shuttle, and a looper.

11. A lock-stitch sewing machine having in combination a work-supporting horn, a pivotally-mounted presser foot, a locking cam to engage the presser foot and clamp the latter against the work, yielding means to actuate said cam, a needle to draw thread through the work, a shuttle, and a looper to cast said loop about the shuttle.

12. A sewing machine having in combination a frame, a work-supporting horn from which under thread is delivered, a presser foot pivoted to the frame for movement toward and from the horn, a shuttle carried by said presser foot, means to draw a loop of thread from the horn through the work and to cast said loop about the shuttle, a lock for the presser foot to clamp the latter against the work, a vibrating actuator constructed to move the lock into operative position while the loop is being drawn through the work and then to release the lock.

13. A sewing machine such as described in claim 12 combined with means to feed the work when the lock is released.

14. A sewing machine having in combination a frame, a work-supporting horn from which an under thread is delivered, a presser foot pivoted to the frame for movement toward and from the horn, a shuttle carried by said presser foot, means to draw a loop of under thread from the horn through the work and to cast said loop about the shuttle, a locking cam for the presser foot to clamp the latter against the work, a vibrating locking actuator, and a yielding connection between said actuator and cam whereby the latter is operated to lock the presser foot while the loop is being drawn through the work and then is operated to release the presser foot.

15. A sewing machine such as described in claim 14 combined with work-feeding means that are actuated by said vibrating actuator.

16. A sewing machine having in combination a frame, a work-supporting horn from which under thread is delivered, a presser foot pivoted to the frame for movement toward and from the horn, a shuttle carried by said presser foot, means to draw a loop of thread from the horn through the work and to cast said loop about the shuttle, a lock for the presser foot to clamp the latter against the work, a vibrating actuator and a yielding connection between said actuator and lock.

17. A lock stitch sewing machine having in combination a work-supporting horn, a shuttle situated above the horn, a reciprocating needle to draw a loop of thread through the work, a rotary looper to cast said loop about the shuttle, a vertically-extending shaft supporting the looper, a vibratory element for giving rotative movement to the shaft, and means carried by said vibrating element to prevent the shaft from overrunning.

18. A sewing machine having in combination a work-supporting element, a needle to draw a loop of thread through the work, a shuttle, a rotary looper to cast said loop about said shuttle, a shaft supporting said looper, a pinion connected to the shaft so that rotation of the pinion in one direction will rotate the shaft while the shaft will remain stationary while the pinion rotates in the opposite direction, an oscillatory member having rack teeth meshing with the pinion, and fingers carried by said oscillatory member and shaft, respectively, which coöperate to prevent the shaft from overrunning.

In testimony whereof, I have signed my name to this specification.

PHILIP A. BOWEN.